United States Patent
Ito et al.

(10) Patent No.: US 10,404,487 B2
(45) Date of Patent: Sep. 3, 2019

(54) COMMUNICATION METHOD, COMPUTER READABLE STORAGE MEDIUM AND INFORMATION PROCESSING DEVICE

(71) Applicant: FUJITSU LIMITED, Kawasaki-shi, Kanagawa (JP)

(72) Inventors: Hidenobu Ito, Kawasaki (JP); Kazuaki Nimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 70 days.

(21) Appl. No.: 15/275,525

(22) Filed: Sep. 26, 2016

(65) Prior Publication Data
US 2017/0093595 A1 Mar. 30, 2017

(30) Foreign Application Priority Data
Sep. 25, 2015 (JP) .................................. 2015-188353

(51) Int. Cl.
*H04L 12/40* (2006.01)
*H04W 52/02* (2009.01)

(52) U.S. Cl.
CPC .... *H04L 12/4013* (2013.01); *H04L 12/40039* (2013.01); *H04L 12/40143* (2013.01);
(Continued)

(58) Field of Classification Search
None
See application file for complete search history.

(56) References Cited

U.S. PATENT DOCUMENTS

2001/0019956 A1  9/2001  Tada
2006/0126531 A1  6/2006  Myojo et al.
(Continued)

FOREIGN PATENT DOCUMENTS

JP    2001-189689    7/2001
JP    2001-358718    12/2001
(Continued)

OTHER PUBLICATIONS

JPOA—Office Action of Japanese Patent Application No. 2015-188353 dated Dec. 18, 2018 with Machine Translation.

*Primary Examiner* — Alpus Hsu
*Assistant Examiner* — Camquyen Thai
(74) *Attorney, Agent, or Firm* — Fujitsu Patent Center

(57) ABSTRACT

A communication method including: receiving, from a first application executed in an information processing device, a first request for setting a first communication mode to specified communications between the information processing device and another device, the first communication mode being a communication mode in which a speed has a higher priority than a power saving, receiving, from a second application executed in the information processing device, a second request for setting a second communication mode to the specified communications, the second communication mode being a communication mode in which the power saving has a higher priority than the speed, and controlling the specified communications after receiving the first and the second requests, the first communication mode being set to the specified communications when the first application performs the specified communications, the second communication mode being set to the specified communications when the first application does not perform the specified communications.

8 Claims, 18 Drawing Sheets

(52) U.S. Cl.
CPC ... *H04W 52/0251* (2013.01); *H04W 52/0261* (2013.01); *H04W 52/0277* (2013.01); *H04W 52/0264* (2013.01); *Y02D 70/00* (2018.01); *Y02D 70/142* (2018.01); *Y02D 70/144* (2018.01); *Y02D 70/164* (2018.01); *Y02D 70/166* (2018.01)

(56) References Cited

U.S. PATENT DOCUMENTS

| | | | | |
|---|---|---|---|---|
| 2012/0122461 | A1* | 5/2012 | Hossain | H04W 72/085 455/450 |
| 2012/0213134 | A1* | 8/2012 | Woo | G06F 1/3209 370/311 |
| 2012/0213135 | A1* | 8/2012 | Woo | G06F 1/3209 370/311 |
| 2012/0220351 | A1 | 8/2012 | Kerai et al. | |
| 2014/0035761 | A1* | 2/2014 | Burton | G01D 4/002 340/870.02 |
| 2014/0301373 | A1* | 10/2014 | Cili | H04W 76/048 370/336 |
| 2014/0335902 | A1* | 11/2014 | Guba | H04W 4/027 455/456.4 |
| 2015/0053144 | A1* | 2/2015 | Bianchi | A01K 27/001 119/720 |
| 2015/0304843 | A1* | 10/2015 | Hillyard | G06F 8/654 726/5 |
| 2015/0358810 | A1* | 12/2015 | Chao | H04W 52/0209 455/418 |

FOREIGN PATENT DOCUMENTS

| | | |
|---|---|---|
| JP | 2004-187002 | 7/2004 |
| JP | 2004-254028 | 9/2004 |
| JP | 2006-173678 | 6/2006 |
| JP | 2006-352522 | 12/2006 |
| JP | 2011-250241 | 12/2011 |
| JP | 2012-533958 | 12/2012 |

* cited by examiner

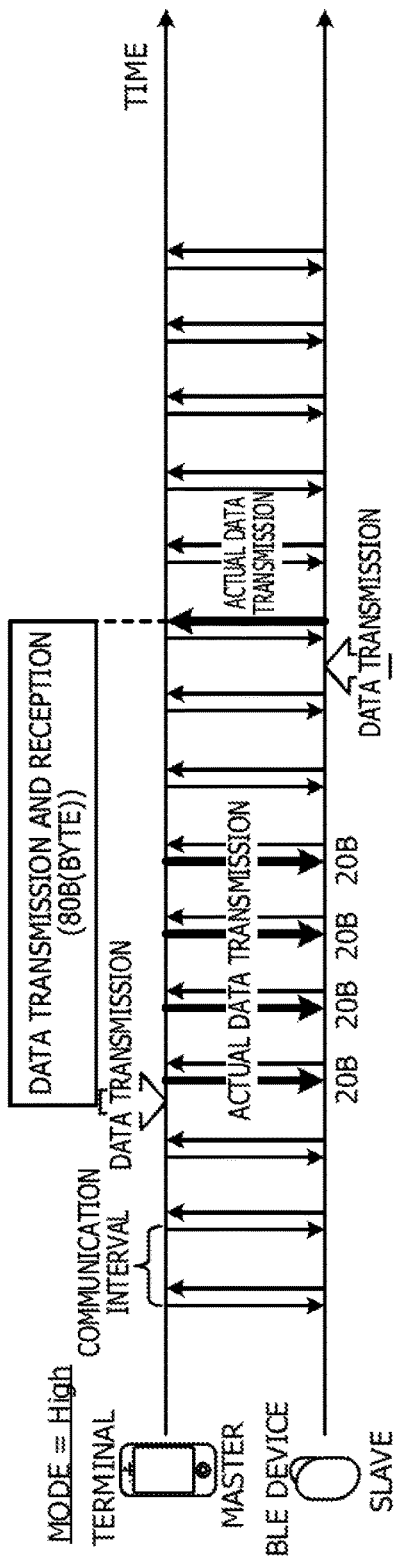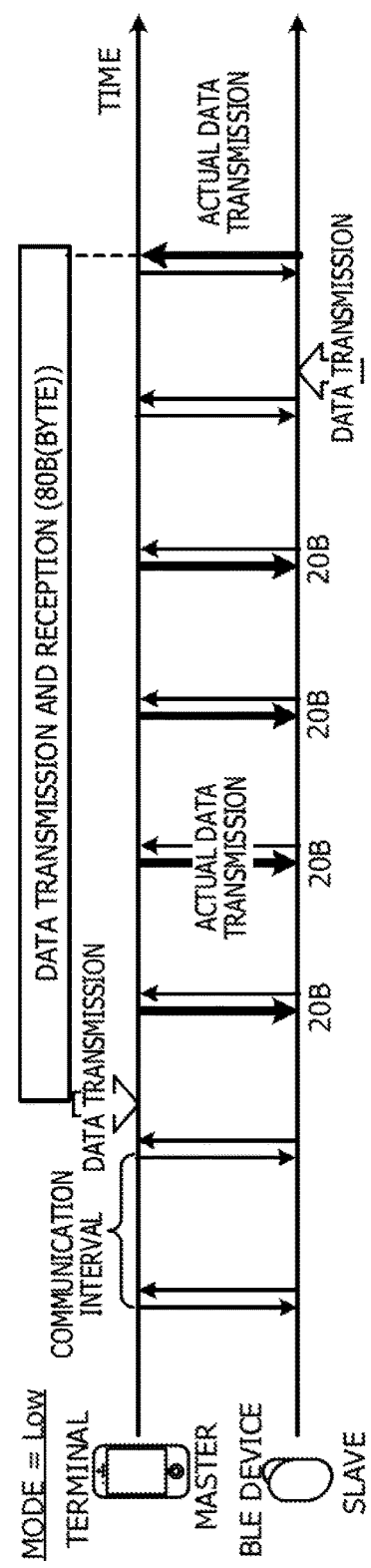

FIG. 5

| APP ID | CONNECTION MODE | DATA TRANSMISSION AND RECEPTION | SCREEN STATE | OPERATION STATE |
|---|---|---|---|---|
| fd3a9b02 | LOW | FALSE | F | TAP |
| 245dff01 | HIGH | TRUE | B | START-UP |
| ... | ... | ... | ... | ... |

FIG. 6

|  | BATTERY REMAINING AMOUNT | RADIO WAVE STATE | ... |
|---|---|---|---|
| TERMINAL STATE | 62% | CONGESTED | ... |

COMMUNICATION METHOD, COMPUTER READABLE STORAGE MEDIUM AND INFORMATION PROCESSING DEVICE

CROSS-REFERENCE TO RELATED APPLICATION

This application is based upon and claims the benefit of priority of the prior Japanese Patent Application No. 2015-188353, filed on Sep. 25, 2015, the entire contents of which are incorporated herein by reference.

FIELD

The embodiment discussed herein is related to a communication method, a communication program, and an information processing device.

BACKGROUND

In recent years, various devices include wireless functions and are capable of connecting to networks, and Internet of Things is now commonly used expression. In order to wirelessly connect a terminal (such as a PC, a smartphone, a tablet, or the like) which serves as a host device and a peripheral device (such as, for example, a keyboard, a mouse, a printer, or the like) to each other, a wireless LAN, Bluetooth (registered trademark), near field communication (NFC), or the like are used in many cases (see, for example, Japanese Laid-open Patent Publication No. 2011-250241, Japanese Laid-open Patent Publication No. 2006-352522, Japanese Laid-open Patent Publication No. 2006-173678, and Japanese Laid-open Patent Publication No. 2001-189689).

In wireless communication, unlike wire communication, there is no physical signal line, and therefore, communication is enabled by adjusting a frequency and time used for communication between a terminal and a peripheral device and causing data to flow therebetween. The state in which this communication is possible is called the "wireless connection state". For example, when connecting devices through Bluetooth low energy (BLE), which is the latest version of the Bluetooth standard, whether or not there is data that is to be transmitted and received, synchronous communication is performed at predetermined intervals while changing the frequency used by the devices (the connection is called synchronous connection).

Setting of synchronization may be determined on a master (terminal) side, but may not be determined on a slave (peripheral device) side. Setting parameters include three types, that is, a communication interval (connection interval), the number of times non-communication on the slave side is allowed (connection slave latency), and a timeout time that is considered to be disconnection (connection supervision timeout). Data transmission and reception may be performed only at a timing of synchronization, and therefore, communication speed (throughput) and power consumption of a device are caused to vary by adjusting the parameters. As the communication interval (synchronization interval) is increased, the power consumption is reduced, but a communication delay tends to occur (power saving priority). On the other hand, as the communication interval is reduced, a communication delay is reduced, but the power consumption is increased (communication speed priority). In order not to increase the complexity of setting, in many cases, only priority designation may be performed via an application (app). For example, in a terminal in which an Android (registered trademark) OS is installed, an app may be in one of the following three modes, that is, High: communication speed priority is set such that a communication interval is set to be short, Low: power saving priority is set such that a communication interval is set to be long, and Balanced: communication speed and power consumption are intermediate such that a communication interval is set to be intermediate.

FIG. 1 is a diagram illustrating an example of a terminal and a BLE device according to a related technology, and in FIG. 1, a case where the terminal is connected to the BLE device through a BLE framework (FW) of an execution environment via BLE communication sections of apps #1 and #2 of the terminal is illustrated.

FIG. 2A and FIG. 2B are diagrams each illustrating an example of a communication interval mode and data transmission, FIG. 2A illustrates an example of data transmission and reception in which the mode is set to "High", and FIG. 2B illustrates an example of data transmission and reception in which the mode is set to "Low". When the mode is set to "High", a communication interval is short (namely a short communication interval is applied) and it takes only a short time to perform data transmission and reception, but, even when there is no data that is to be transmitted and received, communication to identify a communication partner occurs in every communication interval, and the power consumption is increased. Also, when the mode is set to "Low", a communication interval is long (namely a long communication interval is applied), and therefore, it takes a long time to perform data transmission and reception, but communication to identify a communication partner occurs less frequently, and therefore, the power consumption is reduced.

SUMMARY

According to an aspect of the invention, a communication method includes receiving, from a first application executed in an information processing device, a first request for setting a first communication mode to specified communications between the information processing device and another device, the first communication mode being a communication mode in which a speed of communications has a higher priority than a power saving of communications, receiving, from a second application executed in the information processing device, a second request for setting a second communication mode to the specified communications, the second communication mode being a communication mode in which the power saving of communications has a higher priority than the speed of communications, and controlling the specified communications after receiving the first request and the second request, the first communication mode being set to the specified communications when the first application performs the specified communications, the second communication mode being set to the specified communications when the first application does not perform the specified communications.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2A and FIG. 2B are diagrams each illustrating an example of a communication interval mode and data transmission;

FIG. 5 is a table illustrating an example of a connected app state table;

FIG. 6 is a table illustrating an example of a terminal state table;

DESCRIPTION OF EMBODIMENT

As described above, an app may set the degree of priority for a BLE device in consideration of properties of the app itself, but only one degree of priority may be set for a single BLE device. Therefore, when a connection to the BLE device via a plurality of apps that are operating on a terminal is established, a priority conflict occurs. For example, if, after one of the apps is set to communication speed priority, the other one of the apps is set to power saving priority, the degree of priority is rewritten, and the first app is not able to perform data transmission and reception at sufficiently high speed.

Figure 1:
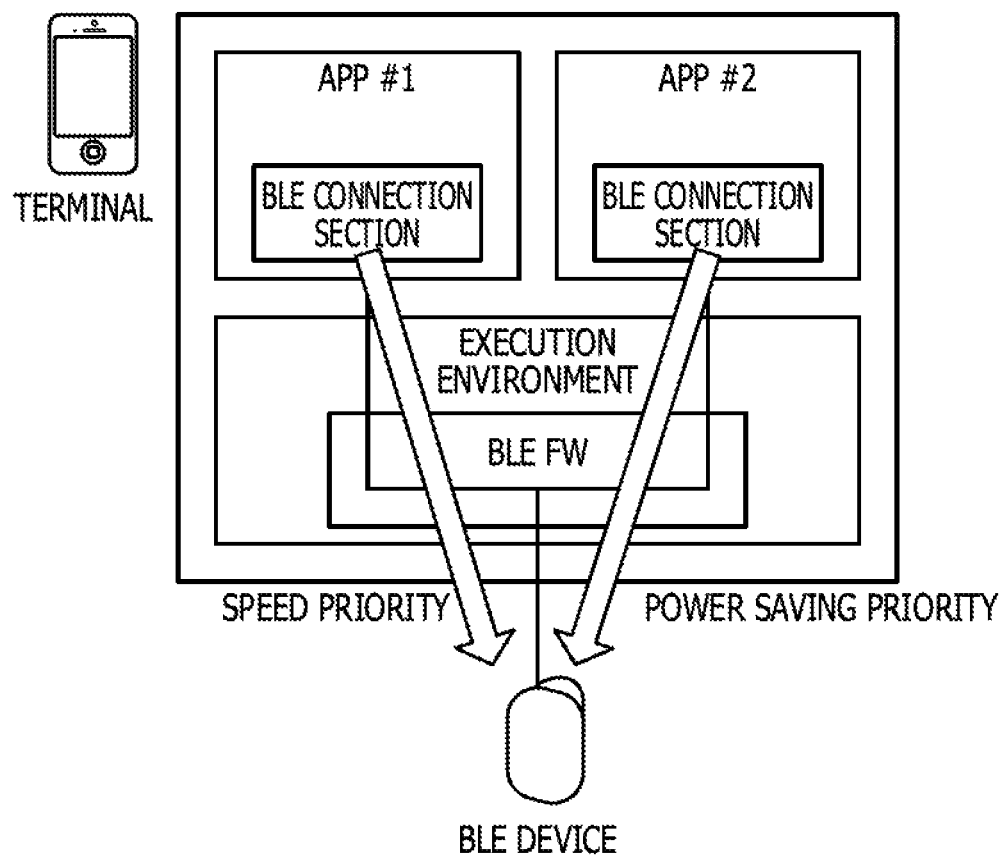
FIG. 1 is a diagram illustrating an example of a terminal and a BLE device according to a related technology.
Figure 3:
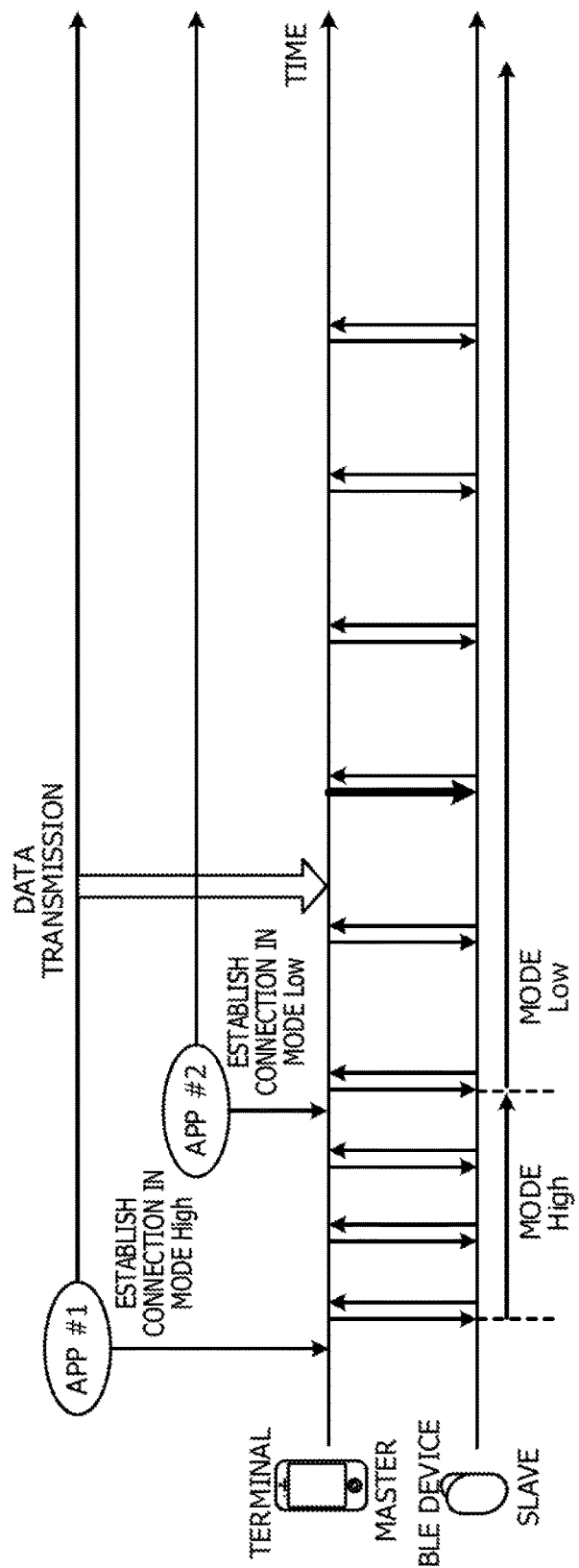
FIG. 3 is a diagram illustrating an example of data transmission when the mode of a communication interval is successively changed by apps.

FIG. 3 is a diagram illustrating an example of data transmission when the mode of a communication interval is successively changed by apps. Although, when an app #1 is first connected to the BLE device in a "High" mode, a communication interval is set to be short, when an app #2 is connected to the BLE device in a "Low" mode, therafter, the communication interval is set to be long, and the app #1 is not able to operate at a communication speed that is expected when the app #1 performs data transmission and reception thereafter.

Note that, although the BLE device has been described, a similar problem arises in a wireless device which performs synchronous connection and may set parameters.

In one aspect, it is therefore an object of the present disclosure to arbitrate connection setting between a plurality of apps and properly adjust communication with a device.

A preferred embodiment of the present disclosure will be described below.

Configuration

Figure 4:
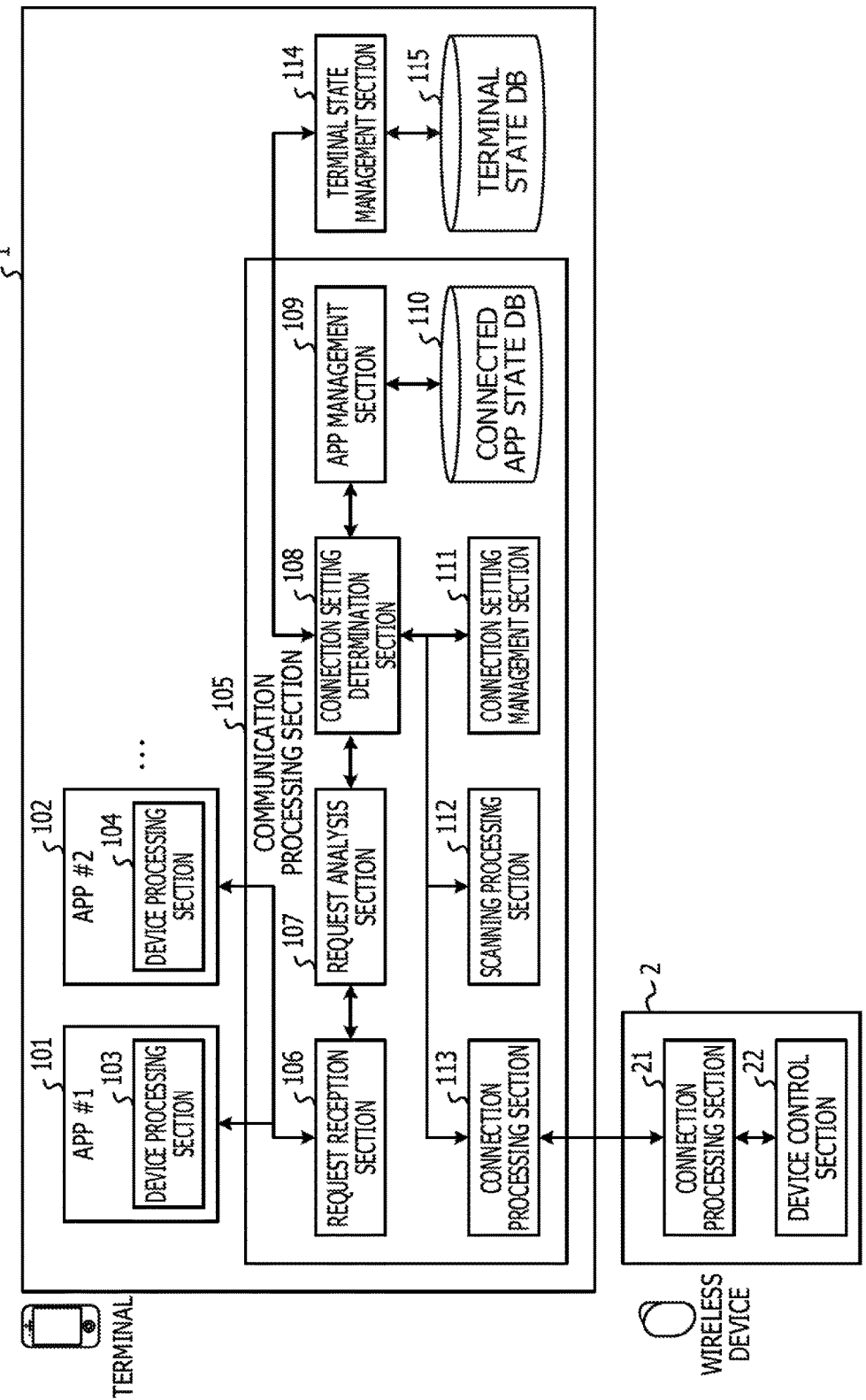
FIG. 4 is a diagram illustrating a software configuration example of a terminal and a wireless device according to an embodiment.

FIG. 4 is a diagram illustrating a software configuration example of a terminal 1 and a wireless device 2 according to an embodiment. In FIG. 4, it is assumed that the terminal 1, such as a smartphone or the like, uses the wireless device 2, such as a mouse or the like. The terminal 1 includes a plurality of apps 101, 102, . . . , a communication processing section 105, a terminal state management section 114, and a terminal state database 115. In each of the apps 101, 102, . . . , a corresponding one of device processing sections 103, 104, . . . that perform processing using the wireless device 2 is provided. The communication processing section 105 is a framework used for controlling the wireless device 2. The terminal state management section 114 and the terminal state database 115 are functions included in an operation system (OS) of the terminal 1, and the terminal state management section 114 records a terminal state, such as a battery remaining amount or the like, of the terminal 1 in the terminal state database 115 to manage the terminal state.

The communication processing section 105 includes a request reception section 106, a request analysis section 107, a connection setting determination section 108, an app management section 109, a connected app state database 110, a connection setting management section 111, a scanning processing section 112, and a connection processing section 113.

The request reception section 106 has a function of receiving a processing request to the wireless device 2 from the apps 101, 102, . . . , and sending back a result of an access to a device in accordance with the processing request. The request analysis section 107 has a function of analyzing the processing request received by the request reception section 106 and determining processing contents for the wireless device 2. The connection setting determination section 108 has a function of referring to current connection setting, connection states of the apps 101, 102, . . . , and a terminal state in accordance with the access to the wireless device 2, and determining proper connection setting. The app management section 109 has a function of holding a state of an app that is currently connected to the wireless device 2 in the connected app state database 110 in order to manage the state. The connection setting management section 111 has a function of holding and managing current connection setting.

The scanning processing section 112 has a function of performing scanning and managing for a wireless radio wave condition. The connection processing section 113 has a function of performing an access to the wireless device 2, based on a determination result of the connection setting determination section 108.

The wireless device 2 includes a connection processing section 21 and a device control section 22. The connection processing section 21 has a function of performing processing, such as establishing connection with the terminal 1, or the like. The device control section 22 has a function of performing original processing (for example, if the device control section 22 is a mouse, move amounts in X and Y directions and an output of a signal, such as a clock or the like) of the wireless device 2.

FIG. 5 is a table illustrating an example of a connected app state table that is held in the connected app state database 110, and the connected app state table includes items of "APP ID", "CONNECTION MODE", "DATA TRANSMISSION AND RECEPTION", "SCREEN STATE", "OPERATION STATE", or the like. "APP ID" is information that uniquely identifies a connected app. "CONNECTION MODE" is a connection mode (corresponding to the degree of priority) which is requested by an app, "Low" indicates power saving priority in which the communication interval is long, and "High" indicates communication speed priority in which the communication interval is short. "DATA TRANSMISSION AND RECEPTION" is information (flag) indicating whether an app is performing transmission and reception ("true") or is not performing transmission and reception ("false"). "SCREEN STATE" is information indicating whether the screen of an app is in a front surface ("F") or not in a front surface ("B"). "OPERATION STATE" is information indicating the state of an operation performed on an app by a user.

FIG. 6 is a table illustrating an example of a terminal state table that is held in the terminal state database 115, and the terminal state table includes items of "BATTERY REMAINING AMOUNT", "RADIO WAVE STATE", or the like.

Figure 7:
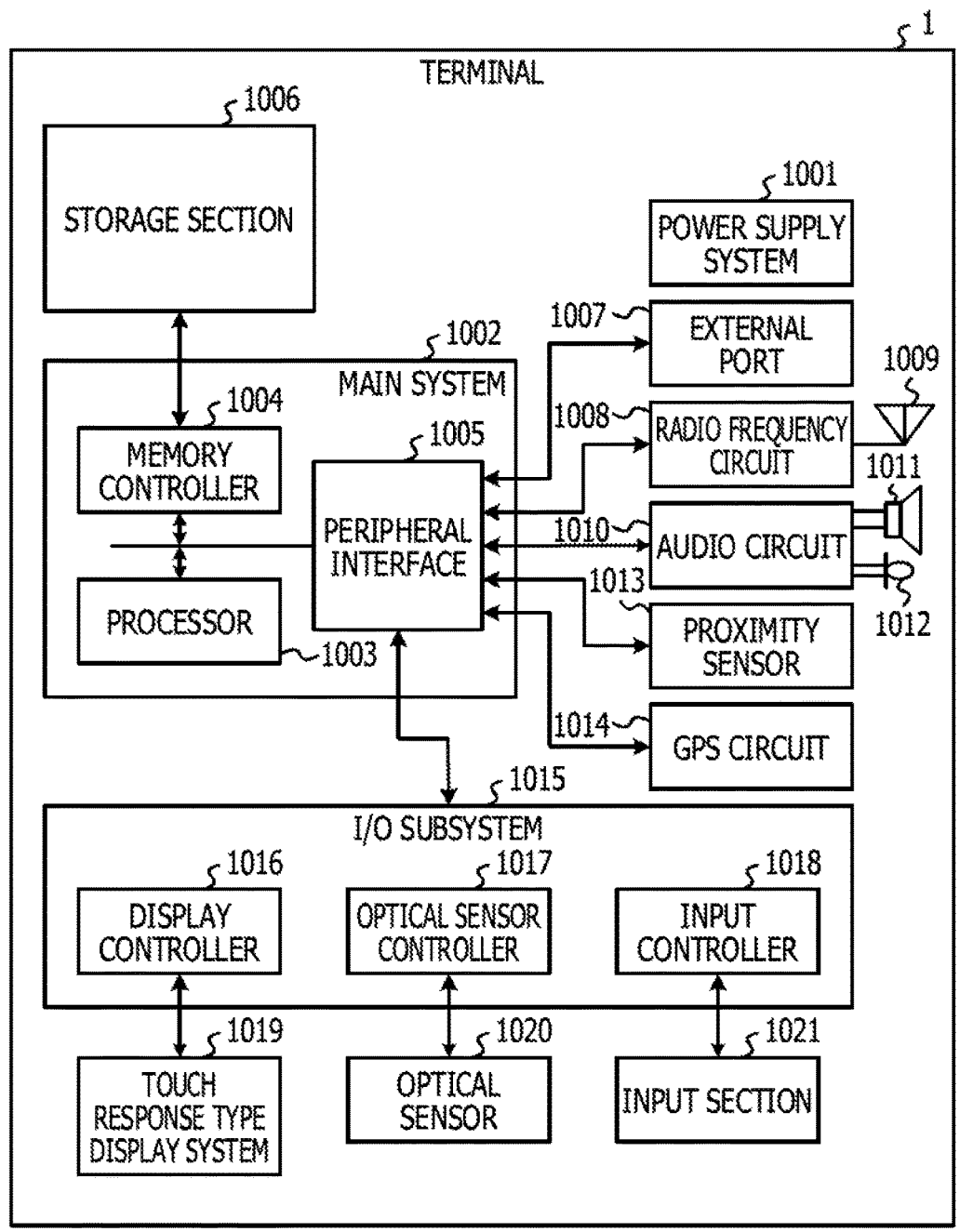
FIG. 7 is a diagram illustrating a hardware configuration example of a terminal.

FIG. 7 is a diagram illustrating a hardware configuration example of the terminal 1. In FIG. 7, the terminal 1 includes a power supply system 1001, a main system 1002 including a processor 1003, a memory controller 1004, and a peripheral interface 1005, and a storage section 1006. The terminal 1 includes an external port 1007, a radio frequency circuit 1008, an antenna 1009, an audio circuit 1010, a speaker 1011, a microphone 1012, a proximity sensor 1013, and a global positioning system (GPS) circuit 1014. The terminal 1 also includes an input and output (I/O) subsystem 1015 including a display controller 1016, an optical sensor controller 1017, and an input controller 1018, a touch-response-type display system 1019, an optical sensor 1020, and an input section 1021.

The function of the terminal 1 illustrated in FIG. 4 is realized by executing a predetermined program in the processor 1003. A program may be acquired via a recording medium, and may be acquired via a network.

Operation

Figure 8:
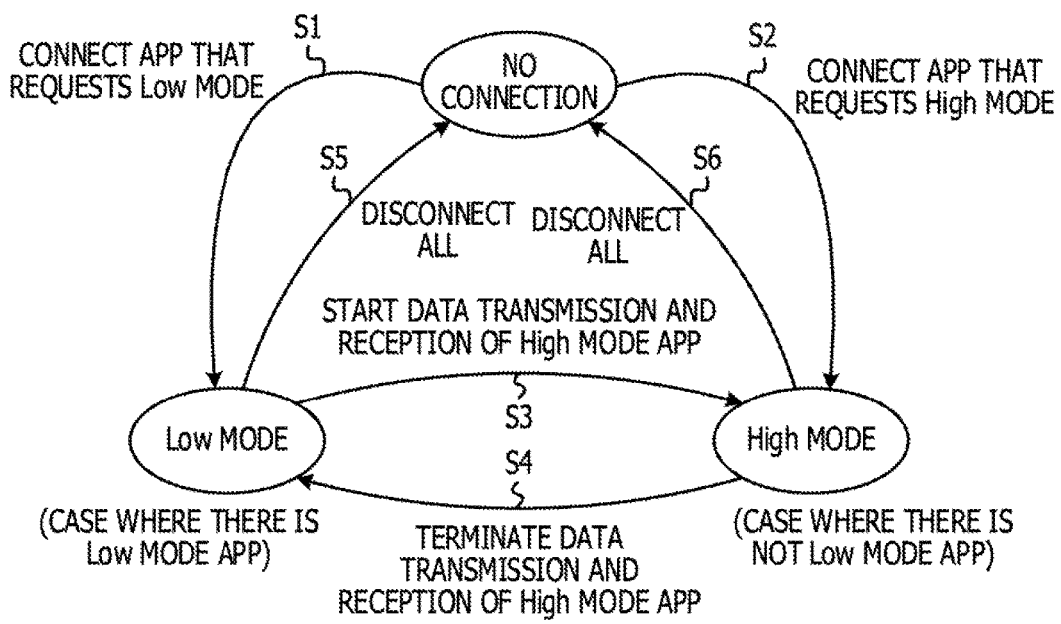
FIG. 8 is a chart illustrating an example of state transition.

FIG. 8 is a chart illustrating an example of state transition related to connection with the wireless device 2 in the terminal 1. In FIG. 8, in a "NO CONNECTION" state in which connection with the wireless device 2 is not established, when an app that requests a "Low" mode is connected to the wireless device 2 (Step S1), the "NO CONNECTION" state is changed to a "Low mode" state. In the "NO CONNECTION" state, when an app that requests a "High" mode is connected to the wireless device 2 (Step S2), the "NO CONNECTION" state is changed to a "High mode" state. Note that, when a plurality of apps is connected to the wireless device 2, even with only one app that requests a "Low" mode, the state is changed to the "Low mode" state, except during data transmission and reception. Also, if there is not any app that requests the "Low" mode, the state is changed to the "High mode" state.

In the "Low mode" state, when data transmission and reception of the app in the "High" mode starts (Step S3), the "Low mode" state is changed to the "High mode" state. When the data transmission and reception of the app in the "High" mode ends in the "High mode" state (Step S4), the state is changed to the "Low mode" state.

In the "Low mode" state, when all apps are disconnected (Step S5), the "Low mode" state is changed to the "NO CONNECTION" state. In the "High mode" state, when all apps are disconnected (Step S6), the "High mode" state is changed to the "NO CONNECTION" state.

Figure 9:
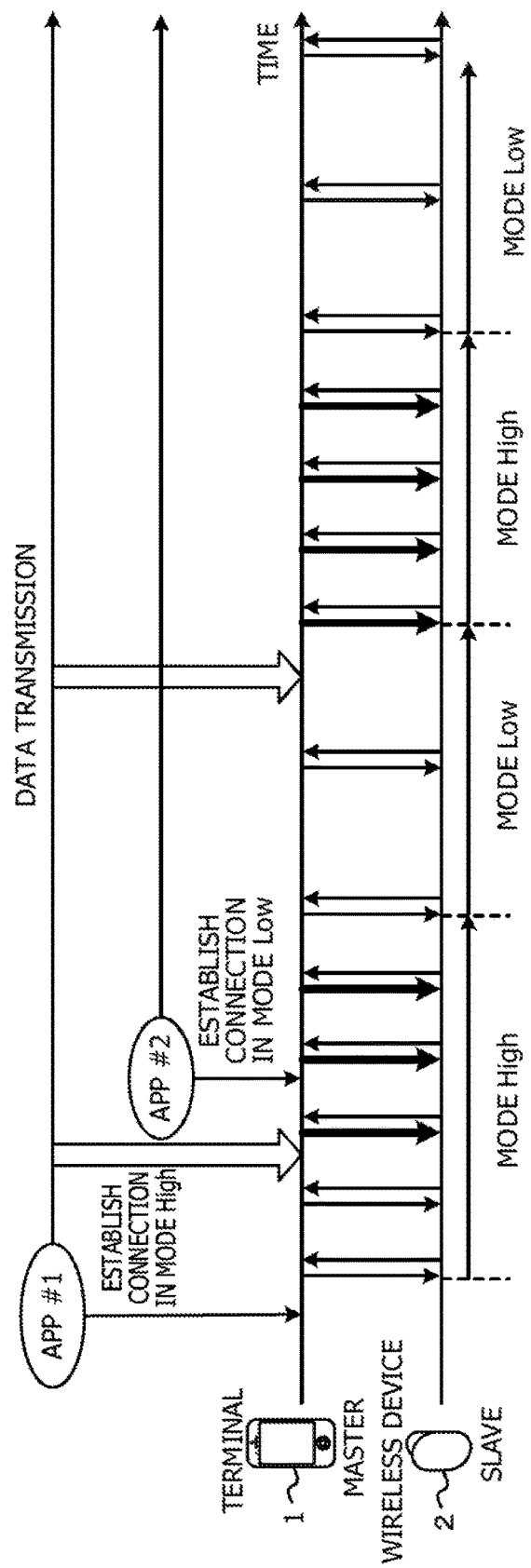
FIG. 9 is a diagram illustrating an example of data transmission when the mode of a communication interval is successively changed by apps.

FIG. 9 is a diagram illustrating an example of data transmission when the mode of a communication interval is successively changed by apps. In FIG. 9, in the "NO CONNECTION" state, when the app #1 is connected in the "High" mode, the wireless device 2 is in the "High" mode in which a communication interval is short. Thereafter, the app #1 performs data transmission in the "High" mode.

When, while the app #1 is performing data transmission, the app #2 is connected to the wireless device 2 in the "Low" mode, since the app #1 is performing data transmission, the wireless device 2 maintains the "High" mode, and is changed to the "Low" mode at the point in time at which data transmission of the app #1 is completed.

Also, when, while the wireless device 2 is in the "Low" mode, the app #1 in the "High" mode starts data transmission, the wireless device 2 is changed to the "High" mode. At the point in time at which data transmission of the app #1 is completed, the wireless device 2 is changed to the "Low" mode.

Figure 10:
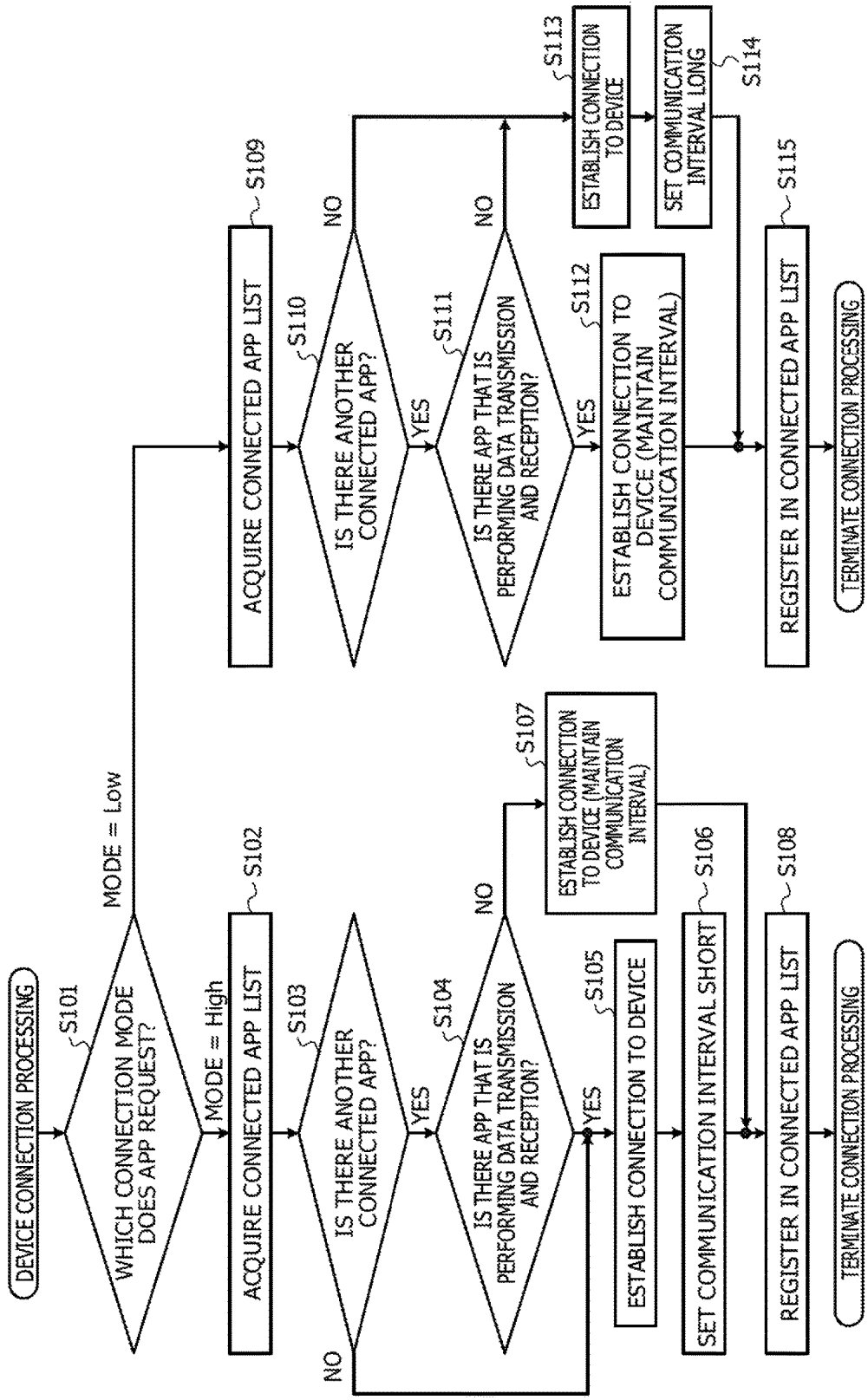
FIG. 10 is a flowchart illustrating an example of processing of device connection.

FIG. 10 is a flowchart illustrating an example of processing of device connection. The request reception section 106 receives a device connection request from an app (101, 102, . . . ), the request analysis section 107 requests the connection setting determination section 108 to determine connection setting. In FIG. 10, the connection setting determination section 108 checks in which connection mode the app serving as a request source has requested connection (Step S101).

If the request connection mode is "High" (Mode=High in Step S101), the connection setting determination section 108 acquires a list (connected app state table) of apps that are connected to the wireless device 2 at that point in time from the app management section 109 (Step S102).

Then, the connection setting determination section 108 checks whether or not there is another connected app (Step S103), and, if there is no other connected app (NO in Step S103) and if the connection is a first connection to the wireless device 2, the connection setting determination section 108 causes connection to the wireless device 2 to be established via the connection processing section 113 (Step S105), and sets the communication interval to be short (Step S106). That is, a connection with the wireless device 2 is established with communication speed priority. At the same time, the connection setting determination section 108 records the current communication interval of communication to the wireless device 2 in the connection setting management section 111.

If there is another connected app (YES in Step S103), the connection setting determination section 108 refers to the connected app state table and checks whether or not there is an app that is performing data transmission and reception (Step S104). If there is an app that is performing data transmission and reception (YES in Step S104), similar to when there is no other connected app, the connection setting determination section 108 causes connection to the wireless device 2 to be established via the connection processing section 113 (Step S105), and sets the communication interval to be short (Step S106). That is, if the connection mode of the app that is performing the data transmission and reception is "High", the "High" mode (communication speed priority) is maintained as is, and, if the connection mode of the app that is performing data transmission and reception is "Low", the data transmission and reception of the app is changed to the "High" mode (communication speed priority).

If there is no app performing data transmission and reception (NO in Step S104), the current communication interval is continuously carried as is, and a connection to the wireless device 2 is established via the connection processing section 113 (Step S107).

When a connection is established, the connection setting determination section 108 registers the ID and state of the app in the connected app state table for the app management section 109 (Step S108).

If the request connection mode of the app is "Low" (Mode=Low in Step S101), the connection setting determination section 108 acquires a list (connected app state table) of apps that are connected to the wireless device 2 at that point in time from the app management section 109 (Step S109).

Then, the connection setting determination section 108 checks whether or not there is another connected app (Step S110), if there is no connected app (NO in Step S110) and if the connection is a first connection to the wireless device 2, a connection to the wireless device 2 is established via the connection processing section 113 (Step S113), and sets the communication interval to be long (Step S114). That is, a connection is established with power saving priority. At the same time, the connection setting determination section 108 records the current communication interval of communication with the wireless device 2 in the connection setting management section 111.

If there is a connected app (YES in Step S110), the connection setting determination section 108 refers to the connected app state table and checks whether or not there is an app that is performing data transmission and reception (Step S111). If there is no app performing data transmission and reception (NO in Step S111), similar to when there is no other connected app, a connection to the wireless device 2 is established via the connection processing section 113 (Step S113), and the communication interval is set to be long (Step S114).

If there is an app that is performing data transmission reception (YES in Step S111), the connection setting determination section 108 continuously carries the current communication interval as is, and a connection to the wireless device 2 is established via the connection processing section 113 (Step S112). That is, if the app is in a communication speed priority state, the communication speed priority is maintained, and, if the app is in a power saving priority state, a connection is established with power saving priority maintained.

When a connection is established, the connection setting determination section 108 registers the ID and state of the app in the connected app state table for the app management section 109 (Step S115).

Figure 11:
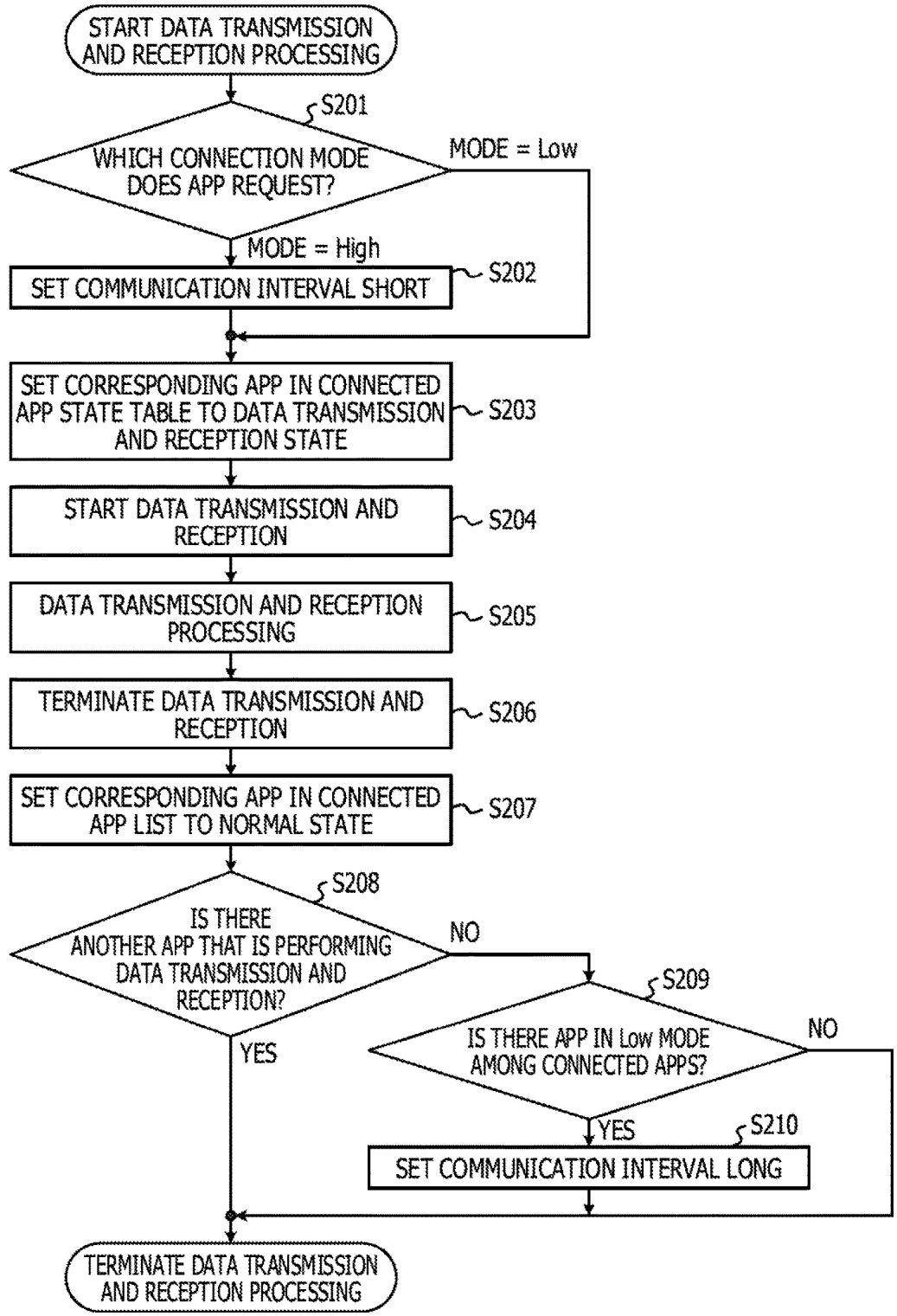
FIG. 11 is a flowchart illustrating an example of processing of data transmission and reception.

FIG. 11 is a flowchart illustrating an example of processing of data transmission and reception. When the request reception section 106 receives a data transmission and reception request from an app (101, 102, . . . ), the request analysis section 107 requests the connection setting determination section 108 to determine connection setting. In FIG. 11, the connection setting determination section 108 first checks in which connection mode the app serving as a request source requests connection (Step S201).

If the connection mode of the request source app is "High" (Mode=High in Step S201), in order to perform processing of data transmission and reception with communication speed priority, the connection setting determination section 108 sets the communication interval to be short, regardless of the current state (Step S202). If the connection mode of the request source app is "Low" (Mode=Low in Step S201), the connection setting determination section 108 does not change the current communication interval.

Thereafter, the connection setting determination section 108 causes the app management section 109 to set the state of the corresponding app in the connected app state table to a data transmission and reception state (Step S203).

Then, the app starts data transmission and reception (Step S204). In this case, if the communication interval is to be changed, the app also transmits a transmission interval change request to the wireless device 2 at initial data transmission and reception communication. Thus, while subsequent data transmission and reception is performed (Step S205), communication is performed at a different communication interval from that in a normal communication.

Then, when data transmission and reception of the corresponding app is completed (Step S206), the request analysis section 107 requests again the connection setting determination section 108 to determine connection setting. The connection setting determination section 108 changes the data transmission and reception state of the wireless device 2 in the connected app state table to a normal state via the app management section 109 (Step S207). Furthermore, it is checked whether there is another app that is performing data transmission and reception at that point in time (Step S208).

If there is no other app that is performing data transmission and reception (NO in Step S208) and if there is at least one app in the "Low" mode among connected apps (YES in Step S209), the connection setting determination section 108 sets the communication interval to be long (Step S210), and transmits a communication interval change request to the wireless device 2. In a case other than that, the connection setting determination section 108 terminates processing without performing anything else (without changing the communication interval).

Note that the timing of communication interval change may not be limited to the timing at which data transmission and reception starts, and the communication interval may be changed at the timing at which the operation state of an app is changed. For example, when an app is displayed on the screen, and when a user operation, such as a screen tap or the like, is received, it is determined that data communication is highly likely to occur, and, at that timing, the communication interval may be changed. In this case, the screen state of an app and the user operation state are registered in the connected app state table and thus are referred to. Also, in such a case, an access to the wireless device 2 might not immediately occur, and therefore, after a certain time has elapsed since the above-described event was detected, the communication state may be set back again to the original communication interval.

Figure 12:
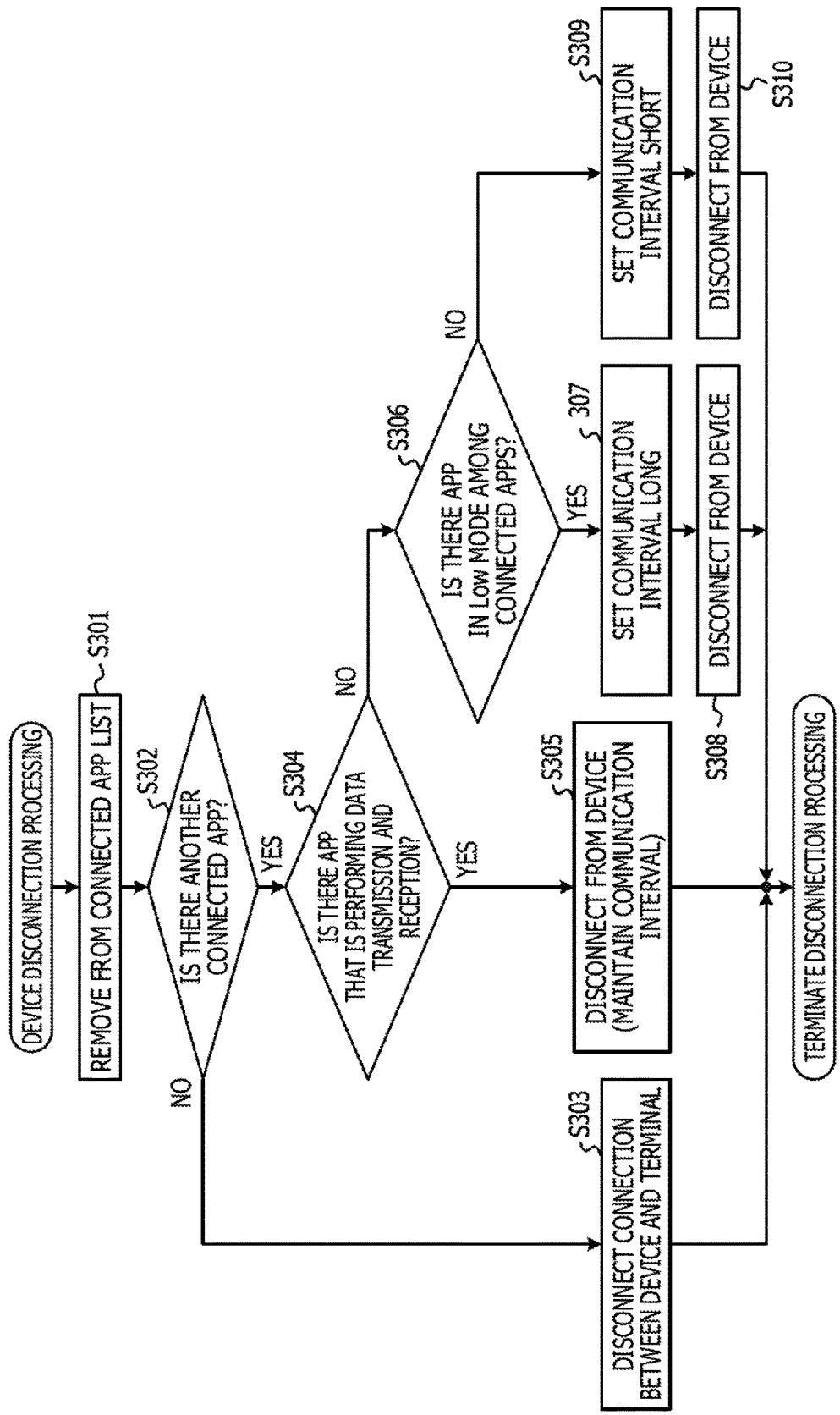
FIG. 12 is a flowchart illustrating an example of processing of device disconnection.

FIG. 12 is a flowchart illustrating an example of processing of device disconnection. When the request reception section 106 receives a device disconnection request from an app, the request analysis section 107 requests the connection setting determination section 108 to determine connection setting. In FIG. 12, the connection setting determination section 108 first removes the entry of a request source app from the connected app state table via the app management section 109 (Step S301).

Thereafter, the connection setting determination section 108 checks whether or not there is another connected app (Step S302), and, if there is no other connected app (NO in Step S302), the connection setting determination section 108 cuts connection between the wireless device 2 and the terminal 1 (Step S303).

If there is another connected app (YES in Step S302) and if there is an app that is performing data transmission and reception (YES in Step S304), the connection setting determination section 108 performs processing of disconnecting the corresponding app without changing the communication interval (Step S305).

If there is no other connected app (NO in Step S304) and if there is at least one app the connection mode of which is the "Low" mode among apps (YES in Step S306), the connection setting determination section 108 sets the communication interval to be long (Step S307), and performs processing of disconnecting the corresponding app (Step S308) as well as transmission of a communication interval change request to the wireless device 2.

If there is no other connected app (NO in Step S304) and if connection modes of apps are all in the "High" mode (NO in Step S306), the connection setting determination section 108 sets the communication interval to be short (Step S309), and performs processing of disconnecting the corresponding app (Step S310) as well as transmission of a communication interval change request to the wireless device 2.

The above-described disconnection processing flow is for a request transmitted from an app, but there are cases where, as for disconnection from the wireless device 2, even without a request transmitted from an app, when a distance between the wireless device 2 and the terminal 1 is increased and when power supply to the wireless device 2 is stopped, the connection is cut. In such a case, the connection processing section 113 detects disconnection of the wireless device 2, and removes the connected app state table of the wireless device 2 (or clears all pieces of data) while notifying a connected app via the request reception section 106 that the connection with the wireless device 2 was cut.

Modification and Extended Example

In the description above, an example of connection arbitration that is performed only by changing a communication interval has been described, but connection arbitration may be performed by changing the value of slave latency, instead of changing the communication interval. That is, if, in a situation in which the communication interval is set to be short, the slave latency is small, and, in a situation in which the communication interval is set to be long, the slave latency is large, a similar effect may be achieved. The slave latency is originally a parameter the value of which is changed for each wireless device 2 in order to reduce the power consumption on the wireless device 2 side, but the value is changed for the same wireless device 2, so that the power consumption at the wireless device 2 may be reduced at the time when an operation is performed with communication speed priority and also a delay at a start of data transmission and reception may be reduced.

Figure 13:
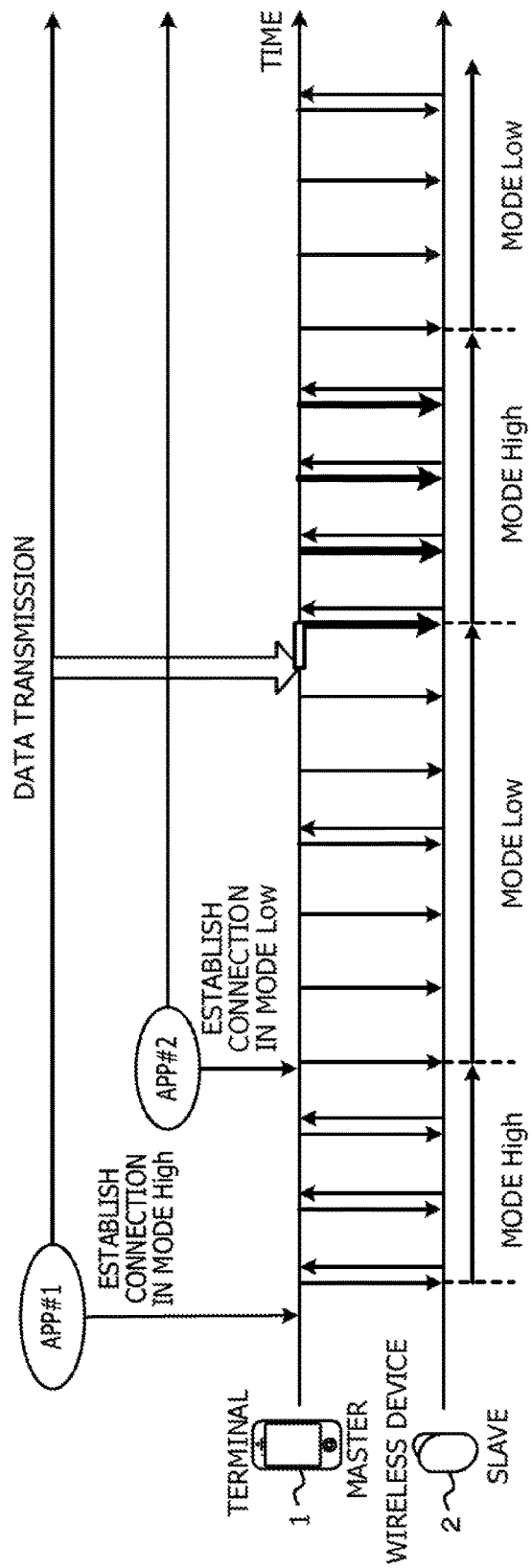
FIG. 13 is a device illustrating an example of data transmission when slave latency, instead of a communication interval, is changed.

FIG. 13 is a device illustrating an example of data transmission when slave latency, instead of a communication interval, is changed. In FIG. 13, when, in the "NO CONNECTION" state, the app #1 is connected to the wireless device 2 in the "High" mode, the wireless device 2 is in the "High" mode in which the slave latency is small.

Thereafter, when the app #2 is connected to the wireless device 2 in the "Low" mode, since the app #1 is not performing data transmission, the wireless device 2 is in the "Low" mode in which the slave latency is large.

When, while the wireless device 2 is in the "Low" mode, the app #1 starts data transmission, the wireless device 2 is changed to the "High" mode in which the slave latency is small. At the point in time at which the data transmission of the app #1 is completed, the wireless device 2 is changed to the "Low" mode.

Figure 14:
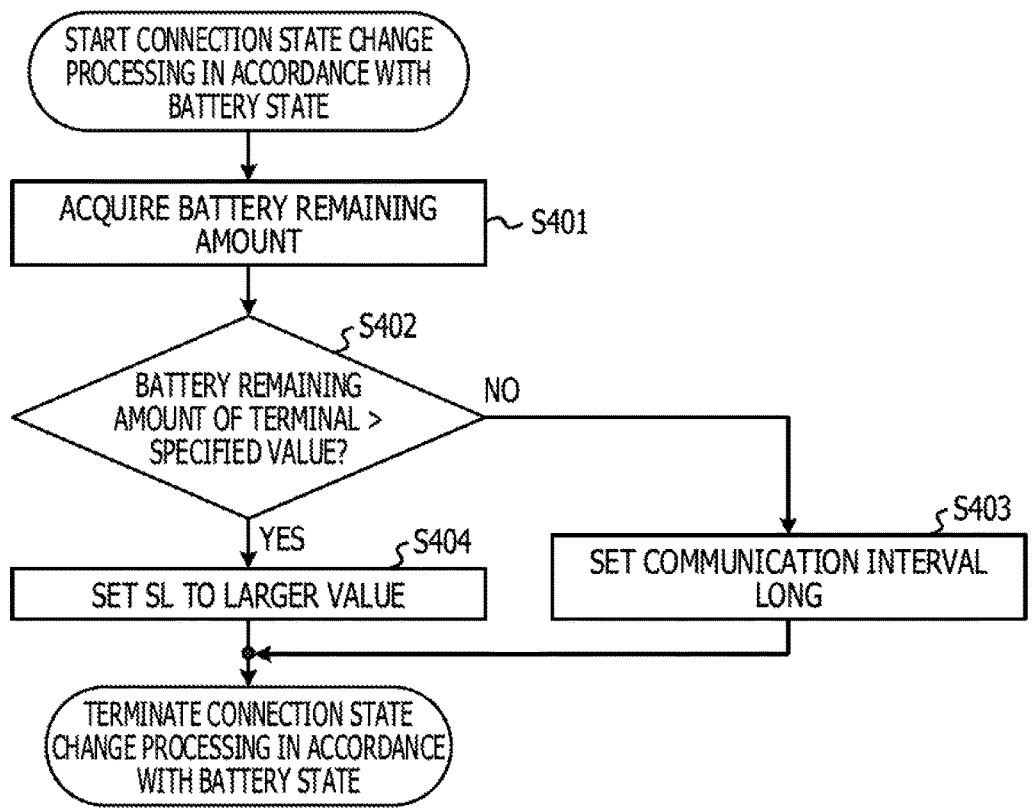
FIG. 14 is a flowchart illustrating an example of processing of changing a connection state in accordance with a battery state.

FIG. 14 is a flowchart illustrating an example of processing of changing a connection state in accordance with a battery state, and in this example, the slave latency is adjusted in consideration of the battery remaining amount of the terminal 1. This is processing with which the processing in which the communication interval is set to be long in each of the flowcharts that have been described above (Step S114 in FIG. 10, Step S210 in FIG. 11, Step S307 in FIG. 12, or the like) may be changed.

In FIG. 14, first, the connection setting determination section 108 acquires the battery remaining amount of the terminal 1 via the terminal state management section 114 (Step S401).

Then, if the acquired value is smaller than a specified value, that is, if the battery remaining amount is small (NO in Step S402), similar to the processing described above, the communication interval is set to be long (Step S403).

If the acquired value is larger than a specific value, that is, the battery remaining amount is sufficiently large (YES in Step S402), the slave latency (SL) is set to be larger than a normal setting value (Step S404).

Thus, the power consumption of the terminal 1 is the same as that when the connection mode is "High", but the power consumption on the wireless device 2 side is small. Also, the communication interval is still short, and therefore, when a data transmission and reception request is made, a delay up to a start of data transmission and reception is advantageously reduced.

When the value of the slave latency is increased, the communication amount from the wireless device 2 to the terminal 1 is reduced, and therefore, a penalty when communication from the wireless device 2 to the terminal 1 fails is increased. For example, when being performed in a state in which a radio wave condition is poor, the communication from the wireless device 2 to the terminal 1 tends to fail, and it is highly likely that the terminal 1 side determines that a response from the wireless device 2 has not been made for a long time and misdetects that disconnection has occurred. Specifically, the number of communication channels that the BLE device may use for establishing a connection is small, that is, 37 channels (which is about the half of the number of communication channels that a classical Bluetooth device may use), and therefore, if there is a plurality of wireless devices 2 in the same place, a probability that the same channel is selected is increased. For example, if there are four devices, communication fails with a probability of 1/9 in theory. Therefore, additionally, the congestion condition of nearby radio waves is estimated, and the value of the slave latency is adjusted in accordance with the estimated congestion condition.

Normally, it is difficult for the terminal 1 to know the congestion condition of a communication channel used for establishing a connection between the wireless device 2 and the terminal 1, and therefore, the congestion degree of the communication channel is estimated from a condition of a difference channel, which the terminal 1 may know. For example, for a BLE device, there is a band, which is called advertisement channel, separately from a communication channel used for establishing a connection, and the condition of the advertisement channel may be known by the scanning processing section 112 at all times. A BLE device that is not connected transmits advertisement data through the advertisement channel at all times.

Figure 15:
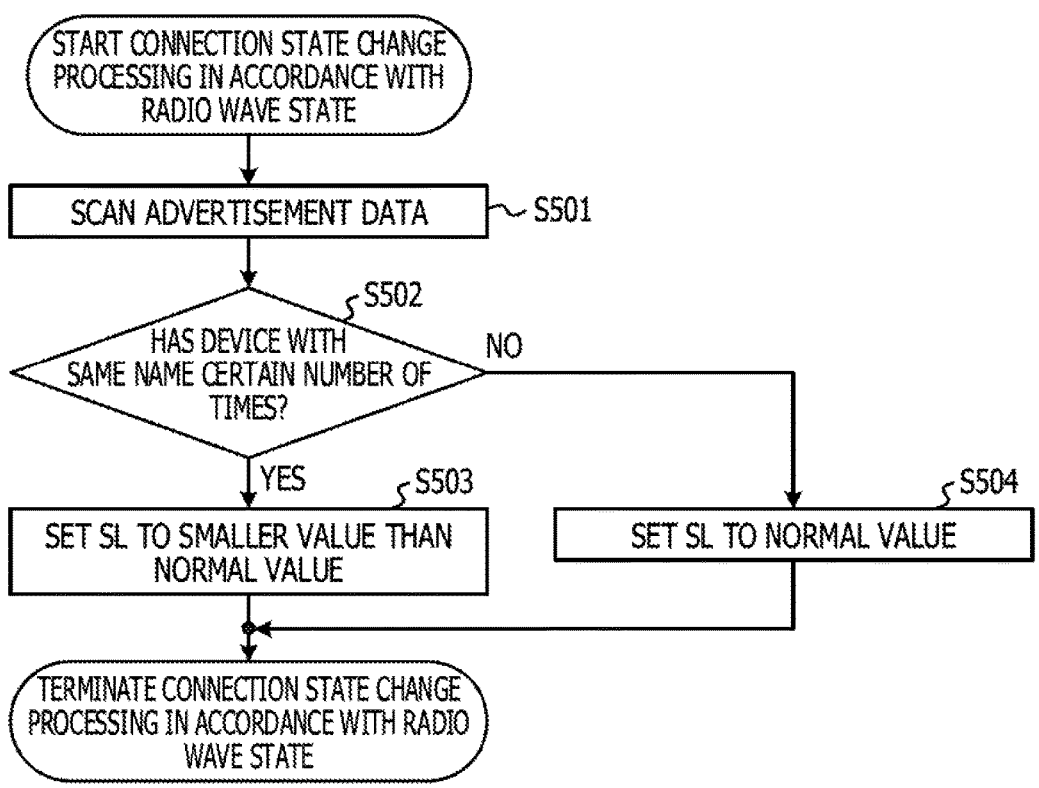
FIG. 15 is a flowchart illustrating an example of processing of communication state change in accordance with a radio wave state.

FIG. 15 is a flowchart illustrating an example of processing of changing a communication state in accordance with a radio wave state, and illustrates processing with which the above-described processing in which the slave latency is set to be large (Step S404 in FIG. 14 or the like) is changed.

In FIG. 15, the connection setting determination section 108 requests the scanning processing section 112 to scan advertisement data and causes the scanning processing section 112 to perform scanning (Step S501).

The connection setting determination section 108 counts, from a scanning result acquired by the scanning processing section 112, the number of devices with the same device name as that of the wireless device 2 that is currently connected, and determines whether or not devices of a certain number have been detected (Step S502). If the number is large, there are a large number of wireless devices that are used in the same manner in a nearby area, and it is assumed that the wireless devices are also used by another terminal in a similar manner. That is, it may be assumed that the usability of a channel that is used for establishing a connection with the wireless device 2 is increased and the probability that communication fails is increased. It may not be determined whether a device with another name only transmits an advertisement or also uses a connection channel in a similar manner to that in which the wireless device 2 uses, and therefore, the device is not counted as one of devices used for determining the congestion degree, but, if there is a correspondence table including the name of another device and whether or not the another device uses a connection channel, the another wireless device may be counted as one of devices used for determining the congestion degree.

Figure 16:
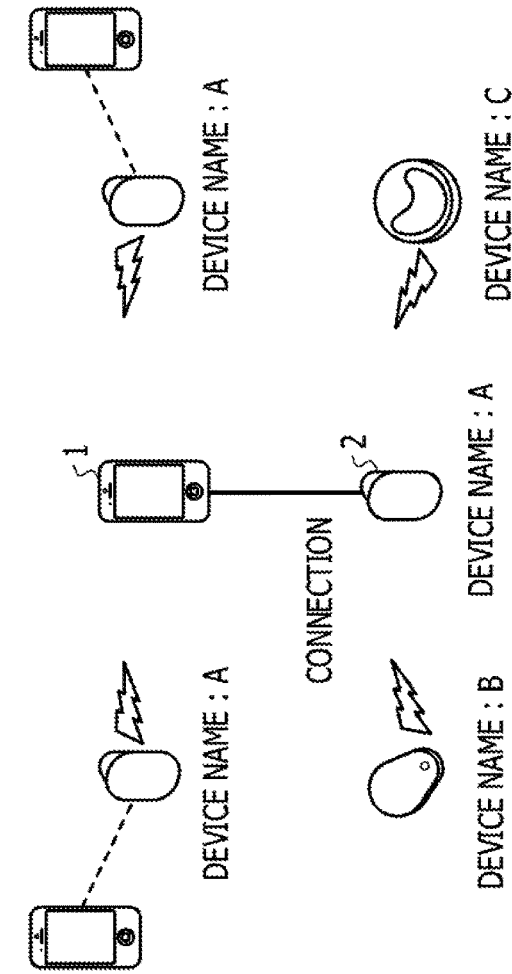
FIG. 16A and FIG. 16B are a table and a diagram illustrating an example of advertisement scanning.

FIG. 16A and FIG. 16B are a table and a diagram illustrating an example of advertisement scanning. In FIG. 16A, assuming that the device name of the wireless device 2 that is connected to the terminal 1 is "A", there are two devices with the same device name, that is, "A", in a nearby area. FIG. 16B illustrates a scanning result, and in FIG. 16B, there are three devices with the device name "A", one device with a device name "B", and one device with a device name "C".

Returning to FIG. 15, if the number of devices with the same device name as that of the wireless device 2 exceeds the specified number (YES in Step S502), the value of the slave latency (SL) is set to be smaller than a normal setting value (Step S503). If the number does not exceed the specified number (NO in Step S502), the value of the slave latency is set to the normal setting value (Step S504).

Thus, although the power consumption of the wireless device 2 is increased, as compared to normal processing, a probability that misdetection of disconnection due to communication failure occurs is reduced, and therefore, a more stable communication state may be maintained.

Furthermore, the communication interval (similar applies to the slave latency) may be finely adjusted in accordance with the throughput on the device side. For example, for a device, such as a printer, the performance largely varies depending on the production manufacturer and the type, and therefore, the setting value of a communication interval is preferably to be changed for each device, but this problem may be solved by providing a correspondence table for the device name and the setting value of a communication interval. In addition, also, for a single device, since, when the load of the device is large, even with a communication interval reduced, a response might not be immediately made, and therefore, the communication interval is further increased, so that the device may be operated with reduced power consumption while keeping the communication speed.

Figure 17:
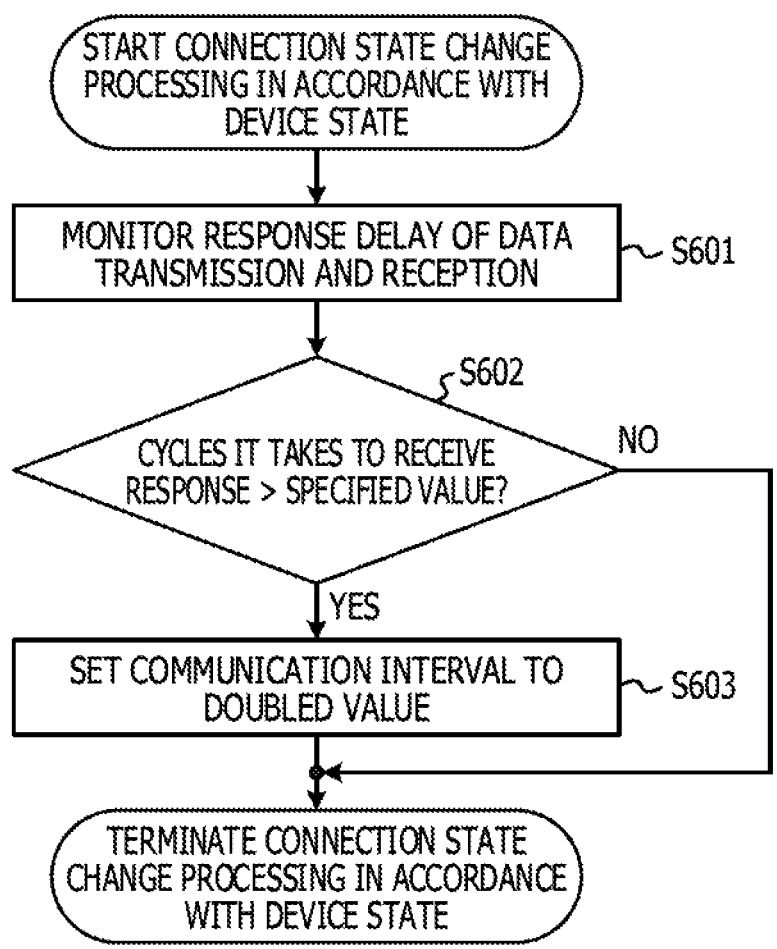
FIG. 17 is a flowchart illustrating an example of processing of changing a connection state in accordance with a device state.

FIG. 17 is a flowchart illustrating an example of processing of changing a connection state in accordance with a device state, and illustrates processing that is added during data transmission and reception.

In FIG. 17, the connection processing section 113 records a delay of a response from the wireless device 2 in a chronological order at the time when data transmission and reception is performed (Step S601). Specifically, certain data is transmitted, and then, how many cycles it has been taken to receive a response thereto is recorded. Since the communication interval is determined for each device, a response cycle at normal use is substantially uniform. However, as the load of a device is increased, a response delay occurs, and therefore, a response cycle is increased.

If the response cycle is larger than a specified value (YES in Step S602), the communication interval is set, for example, to a doubled value (Step S603).

Thus, the amount of communication that does not contribute data transmission and reception is reduced, and therefore, further power saving may be achieved while the communication speed is kept. Also, although, in the above-described example, if a response delay exceeds a specified value even once, the communication interval is changed, in order to increase accuracy of determination of a response delay, the number of times the response delay has occurred exceeds the specified value in a certain time may be acquired, and when the number exceeds a certain number, the communication interval may be changed. Also, if the number of times empty communication (communication that does not contribute data transmission and reception) has been performed is lower than a certain number, the communication interval is set back to the original communication interval. Thus, processing may be performed with power further saved, while the speed of data transmission and reception is kept as high as possible in a range of the throughput of a device.

Figure 18:
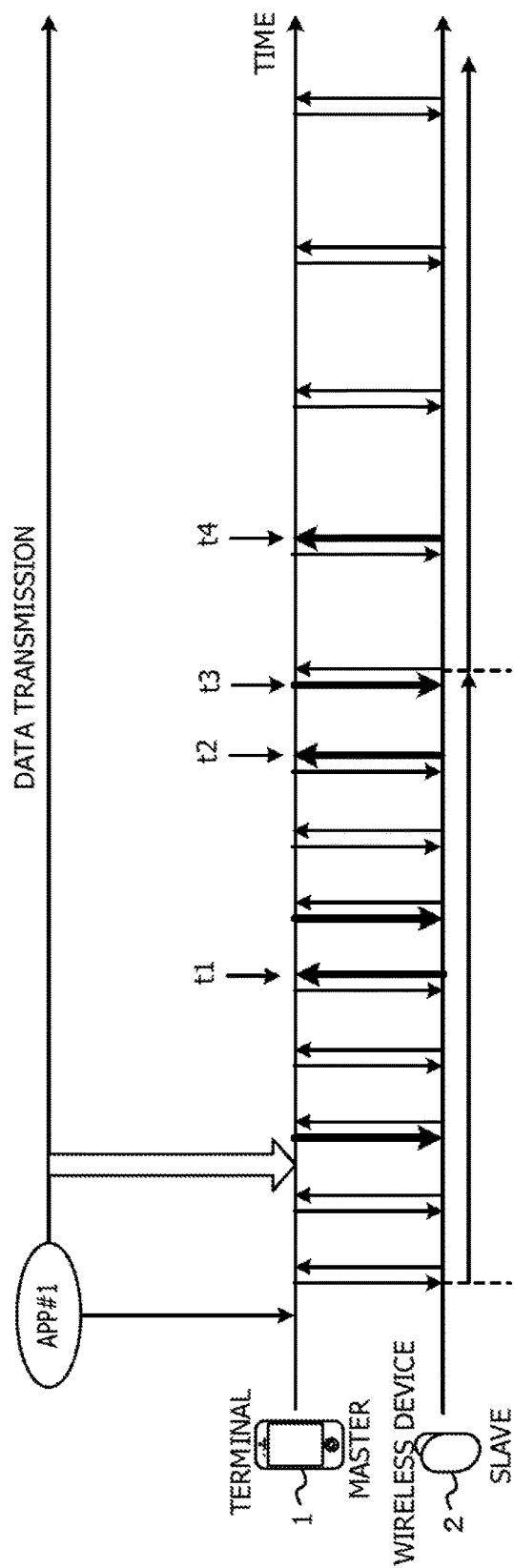
FIG. 18 is a diagram illustrating an example of connection state change in accordance with data transmission.

FIG. 18 is a diagram illustrating an example of connection state change during data transmission. In FIG. 18, while data transmission from the app #1 of the terminal 1 to the wireless device 2 is performed, a response is detected one cycle delay at a time t1, but, since there is a probability of an incidental response error, it is not determined at this point in time that a response delay has occurred. However, when it is detected again that a response is delayed by one cycle at a time t2, it is determined that a response delay has occurred, and the communication interval is increased at the same timing as a time t3 at which next data transmission is performed. Thus, there is no longer a delay of a response from the wireless device 2 at a time t4, and meaningless communication may be reduced.

General Overview

As has been described above, according to this embodiment, connection setting is arbitrated between a plurality of apps, and communication with a device may be properly adjusted.

A preferred embodiment has been described above. The embodiment has been described using a specific example, but it is apparent that various other modifications and alternate constructions can be made thereto without departing from the gist and scope of the disclosure defined in the scope of claims. That is, the present disclosure is not limited to the detail set forth in the specific example and the accompanying drawings.

The wireless device 2 is an example of the "device". The communication interval or the slave latency is an example of the "connection setting".

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A communication method executed by an information processing device that includes a plurality of applications, the communication method comprising:
   receiving a first request for communicating with a device from a first application of the plurality of applications;
   determining, in response to the received first request, a connection setting related to a communication between the information processing device and the device;
   executing the communication by the first application based on the determined connection setting;
   receiving a second request for communicating with the device from a second application of the plurality of applications;
   when the connection setting is a first mode to communicate using a first communication interval and when the second request indicates a second mode to communicate using a second communication interval which is longer than the first communication interval:
      maintaining the connection setting in the first mode until data transmission between the first application and the device is completed, and
      executing the communication by the second application in the second mode after the data transmission is completed; and
   when the connection setting is the second mode and when the second request indicates the first mode:
      executing, in response to the received second request, the communication by the second application in the first mode, and
      executing the communication by the first application in the second mode after data transmission between the second application and the device is completed,
   wherein the connection setting includes a value of slave latency that indicates a number of times that non-communication on the device side is allowed and adjustment of the slave latency affects power consumption of the device.

2. The communication method according to claim 1, wherein the specified communications are synchronous wireless communications.

3. The communication method according to claim 1, wherein
   when there exists a connected application but there exists no application which is under data transmission or reception and the requested communication mode corresponds to the first mode, maintaining the communication mode previously set to the specified communications; and
   when there exists a connected application but there exists no application which is under data transmission or reception and the requested communication mode corresponds to the second mode, setting the second mode to the specified communications.

4. The communication method according to claim 1, wherein
   the information processing device is a host device, and
   the device is a peripheral device of the host device.

5. The communication method according to claim 1, further comprising:
   when the connection setting is the first mode and when the second request indicates the second mode, switching the connection setting from the first mode to the second mode by increasing the value of the slave latency after the data transmission between the first application and the device is completed, and
   when the connection setting is the second mode and when the second request indicates the first mode, switching the connection setting from the first mode to the second mode by increasing the value of the slave latency after the data transmission between the second application and the device is completed.

6. The communication method according to claim 1, further comprising:
   when a remaining battery level of the information processing apparatus is larger than a specified value, changing the communication setting by increasing the value of the slave latency.

7. A non-transitory computer readable storage medium that stores a program that causes a computer to execute a process, the process comprising:
   receiving a first request for communicating with a device from a first application of the plurality of applications;
   determining, in response to the received first request, a connection setting related to a communication between the information processing device and the device;
   executing the communication by the first application based on the determined connection setting;
   receiving a second request for communicating with the device from a second application of the plurality of applications;
   when the connection setting is a first mode to communicate using a first communication interval and when the second request indicates a second mode to communicate using a second communication interval which is longer than the first communication interval,
      maintaining the connection setting in the first mode until data transmission between the first application and the device is completed, and
      executing the communication by the second application in the second mode after the data transmission is completed; and
   when the connection setting is the second mode and when the second request indicates the first mode,
      executing, in response to the received second request, the communication by the second application in the first mode, and
      executing the communication by the first application in the second mode after data transmission between the second application and the device is completed,
   wherein the connection setting includes a value of slave latency that indicates a number of times that non-communication on the device side is allowed and adjustment of the slave latency affects power consumption of the device.

8. An information processing device comprising:

a memory; and a processor coupled to the memory and the processor configured to:

receive a first request for communicating with a device from a first application of the plurality of applications, determine, in response to the received first request, a connection setting related to a communication between the information processing device and the device, execute the communication by the first application based on the determined connection setting, receive a second request for communicating with the device from a second application of the plurality of applications, when the connection setting is a first mode to communicate using a first communication interval and when the second request indicates a second mode to communicate using a second communication interval which is longer than the first communication interval:

maintain the connection setting in the first mode until data transmission between the first application and the device is completed, and execute the communication by the second application in the second mode after the data transmission is completed, and when the connection setting is the second mode and when the second request indicates the first mode:

execute, in response to the received second request, the communication by the second application in the first mode, and execute the communication by the first application in the second mode after data transmission between the second application and the device is completed, wherein the connection setting includes a value of slave latency that indicates a number of times that non-communication on the device side is allowed and adjustment of the slave latency affects power consumption of the device.

\* \* \* \* \*